United States Patent [19]

Davis

[11] 4,269,879
[45] May 26, 1981

[54] SOLVENTLESS EPOXY-BASED COATING COMPOSITION, METHOD OF APPLYING AND ARTICLE COATED THEREWITH

[75] Inventor: Murray L. Davis, Boxford, Mass.

[73] Assignee: The Dampney Company, Everett, Mass.

[21] Appl. No.: 31,840

[22] Filed: Apr. 20, 1979

[51] Int. Cl.³ .................. F16L 9/02; F16L 9/08
[52] U.S. Cl. .................. 428/36; 260/28 R; 427/386; 427/421; 427/429; 428/332; 428/413; 428/418; 428/446; 428/457; 528/111; 528/122
[58] Field of Search .............. 427/386, 421, 422, 429; 428/413, 418, 36, 332; 260/28 R; 528/122, 111

[56] References Cited

U.S. PATENT DOCUMENTS

| | | | |
|---|---|---|---|
| 2,824,078 | 2/1958 | Mellick | 260/28 |
| 2,906,720 | 9/1959 | Simpson | 260/28 |
| 2,976,256 | 3/1961 | Whittier | 260/28 |
| 3,012,487 | 12/1961 | Mika | 260/28 |
| 3,033,088 | 5/1962 | Whittenwyler | 260/28 |
| 3,105,771 | 10/1963 | Simpson et al. | 260/28 |
| 3,160,518 | 12/1964 | Jorda | 428/418 |
| 3,190,845 | 6/1965 | Goodnight | 260/28 |
| 3,297,056 | 1/1967 | McLaughlin et al. | 260/28 |
| 3,367,911 | 2/1968 | Daum et al. | 528/122 |
| 3,374,186 | 3/1968 | Steden et al. | 528/122 |
| 3,538,184 | 11/1970 | Heer | 528/111 |
| 3,625,918 | 12/1971 | Heer et al. | 528/122 |
| 3,629,181 | 12/1971 | Heer et al. | 528/122 |
| 3,639,344 | 2/1972 | Kinneman et al. | 427/386 |
| 3,654,191 | 4/1972 | Habermeier et al. | 260/28 |
| 3,658,728 | 4/1972 | Hoffman et al. | 528/122 |
| 3,679,465 | 7/1972 | Flynn | 427/386 |
| 3,704,229 | 11/1972 | Tashiro et al. | 528/120 |
| 3,713,867 | 1/1973 | Parkinson et al. | 427/314 |
| 3,751,471 | 8/1973 | Becker | 260/28 |
| 3,755,226 | 8/1973 | Christiansen et al. | 260/28 |
| 3,763,102 | 10/1973 | Hoffman et al. | 528/124 |
| 3,880,789 | 4/1975 | Ishihara et al. | 260/28 |
| 3,917,702 | 11/1975 | Hirosawa | 528/107 |

*Primary Examiner*—Ronald H. Smith
*Assistant Examiner*—S. L. Childs
*Attorney, Agent, or Firm*—Thompson, Birch, Gauthier & Samuels

[57] ABSTRACT

The invention relates to a low-viscosity, solvent-free epoxy-based coating composition consisting essentially of:

(a) an epoxy fraction consisting of polyphenol epoxy resins and mixtures thereof; and
(b) a curing fraction consisting essentially of:
 (1) a non-volatile, aromatic extender selected from the group consisting of coal tar, distillates of coke and petroleum with boiling points above about 200° C., and mixtures thereof;
 (2) an amine curing agent having a molecular weight of about 200–600 selected from the group consisting of:
 (i) cycloaliphatic diamines having a single amine group directly attached to a single ring structure and the other amine group directly attached to a carbon atom in an aliphatic chain or to a second ring structure;
 (ii) polyamines having polyaliphatic oxide backbones; and,
 (iii) mixtures thereof; and,
 (3) a curing accelerator selected from the group consisting of tertiary amines.

25 Claims, 1 Drawing Figure

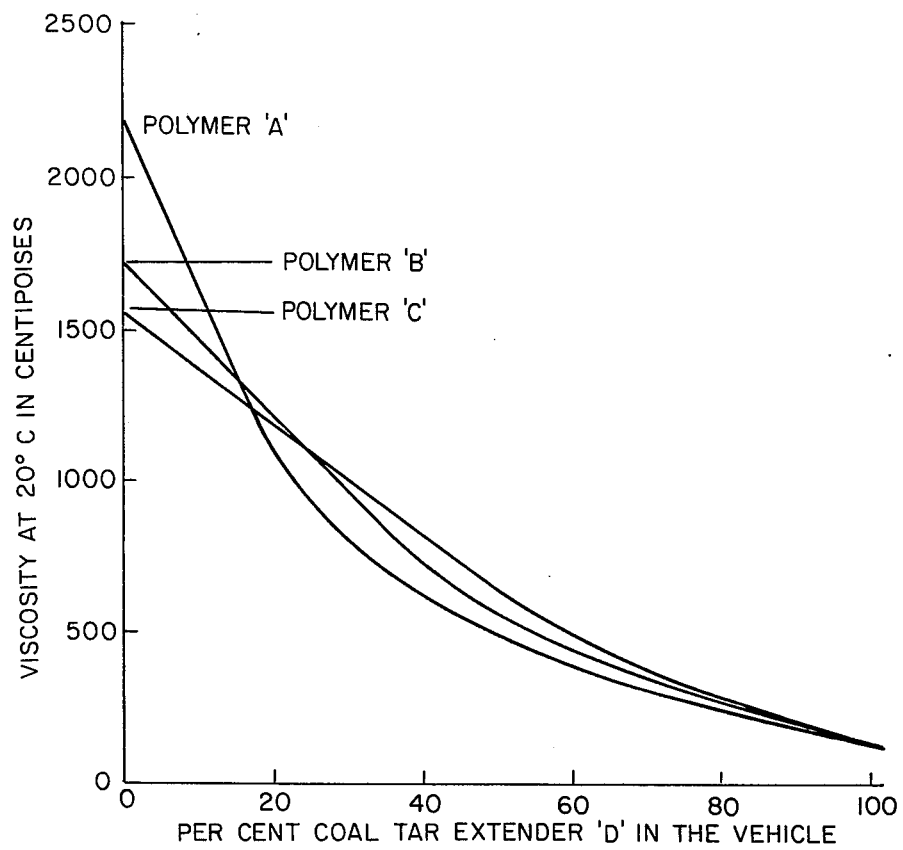

SOLVENTLESS EPOXY-BASED COATING COMPOSITION, METHOD OF APPLYING AND ARTICLE COATED THEREWITH

BACKGROUND OF THE INVENTION

It is well-known in the art to produce coal tar/epoxy compositions for coating, insulation, encapsulation and similar uses. Such compositions typically include 20% or more of volatile solvents and diluents to maintain a low viscosity for spray applications and for good compatibility between the coal tar and epoxy components. It is also well-known in the art to employ amine curing agents for hardening such coal tar/epoxy compositions.

The need for volatile solvents in such compositions in the past has greatly limited their applications as well as detracted from the overall quality of the resulting coatings. Thus, because of the intermediate need for flammable solvents which are difficult to completely drive-off from the final product, coal tar/epoxy compositions have had limited use in some electrical encapsulation and certain coating applications. Also, the process of driving-off the volatile solvents during curing often results in blistering of coatings, non-uniformity and inferior adhesion properties. Moreover, the need for volatile solvents and diluents reduces the concentrations of reaction ingredients during the curing phase and results in a coating of inferior hardness, water-resistance and impact strength. Furthermore, government regulations have increasingly restricted the amount and nature of volatile solvents which may be discharged into the atmosphere. One approach to this problem used in the past was to employ reactive solvents and diluents. These materials, however, are prohibitively expensive and still present certain problems. Accordingly, it has long been desired to formulate coal tar/epoxy compositions having viscosities less than about 1000 cps. at ambient conditions without the use of volatile solvents.

THE PRIOR ART

The most relevant prior art is believed to consist of the following United States patents and Chemical Abstracts references.

| U.S. Pat. No. | Inventor(s) | Issue Date |
| --- | --- | --- |
| 3,629,181 | Heer et al. | Dec. 21, 1971 |
| 3,625,918 | Heer et al. | Dec. 7, 1971 |
| 3,538,184 | A. Heer | Nov. 3, 1970 |
| 3,704,229 | Tashiro et al. | Nov. 28, 1972 |
| 3,755,226 | Christiansen et al. | Aug. 28, 1973 |
| 3,751,471 | W. Becker | Aug. 7, 1973 |
| 3,917,702 | F. Hirosawa | Nov. 4, 1975 |
| 3,658,728 | Hoffman et al. | Apr. 25, 1972 |
| 3,374,186 | Steden et al. | Mar. 19, 1968 |
| 3,679,465 | R. Flynn | July 25, 1972 |
| 3,763,102 | Hoffman et al. | Oct. 2, 1973 |
| 3,367,911 | Daum et al. | Feb. 6, 1968 |
| Chemical Abstracts | Inventor(s) | Date |
| 71:4576 f | Heer et al. | 1969 |
| 78:17075 n | P. Stahl | 1973 |
| 68:13737 | N. V. Philips | 1968 |

U.S. Pat. No. 3,629,181 discloses the preparation of new curing agents for solvent-free liquid epoxide compositions. The new curing agents are relatively viscous adducts of a polyphenol-polyglycidyl ether and a cycloaliphatic di-primary diamine, in particular isophorone diamine. This same patent also teaches the use of low volatility diluents, such as dibutyl phthalate, and curing "accelerators" such as phenols. Conventional additives such as fillers, pigments and dyestuffs may also be used in these compositions. The resultant coatings are observed to be free of the usual surface faults when cured at room temperature. The relatively viscous adducts of this patent are necessary because, in unreacted form, the aliphatic amine reacts rapidly in the presence of moisture at the surface resulting in the formation of amine carbonates which give poor surface properties and appearances. Chemical Abstracts reference 71:4576f and U.S. Pat. Nos. 3,625,918 and 3,538,184 by the same inventor also discuss polyepoxide-cycloaliphatic diamine adducts and emphasize the special importance of having one cyclic and one aliphatic-attached amine group. There is no suggestion in any of these references, however, of using the cycloaliphatic diamines without pre-reacting them to form the relatively viscous adducts.

U.S. Pat. No. 3,704,229 discloses the preparation of a new curing agent for solvent-free coal tar/epoxy compositions consisting of a three-component condensation product, the key component of which is a cycloaliphatic diamine, namely xylylene diamine. The resulting curing agents are stated to have low viscosity and good compatibility with epoxy resins. The resulting coal tar/epoxy compositions are stated to have superior water and chemical resistance and other properties as compared with conventional compositions. Furthermore, diluents, fillers, reinforcing agents and pigments may optionally be added. Again, however, there is no suggestion that the xylylene diamine of this reference can be used without pre-reacting it to form relatively viscous adducts.

U.S. Pat. No. 3,755,226 shows that it is generally known to use tertiary amines as curing accelerators for coal tar (Bitumen)/epoxy compositions. A cycloaliphatic amine may also be used as a curing accelerator. This patent, however, is directed only to a solvent-containing system.

U.S. Pat. Nos. 3,751,471; 3,917,702; 3,658,728; 3,374,186; 3,679,465; 3,763,102; and, 3,367,911 all disclose the preparation of low viscosity liquid curing agents for solvent-free epoxy compositions based on various types of cyclic and cycloaliphatic diamines. These patents are not as relevant as U.S. Pat. No. 3,629,181 because they generally encompass a much broader range of diamines and diamine adducts than those to which the present invention is limited. They are relevant, however, in that they all clearly recognize the problems of solvent-containing epoxy systems and the desirability of eliminating solvents through the use of low viscosity curing agents. None of these patents, however, suggests a solution to the moisture problem which has typically led to pre-reacting cycloaliphatic amines resulting in relatively viscous adducts.

The remaining two Chemical Abstracts references, 78:17075n and 68:13737z, are cited here merely as early disclosures of the discovery that isophorone diamine is useful as a cross-linking agent for epoxy resins.

OBJECTS OF THE INVENTION

It is, accordingly, the primary object of this invention to provide a low-viscosity epoxy-based coating composition.

It is also an object of this invention to provide a low-viscosity epoxy-based coating composition which is substantially free of volatile solvents, i.e. contain less than about 5 wt.-% of these materials.

Another object of this invention is to provide an epoxy-based coating composition which is relatively insensitive to moisture, can be readily-applied, and which exhibits superior surface characteristics such as improved appearance, hardness, water-resistance, impact strength, and flexibility upon curing.

Still another object of this invention is to provide a low-viscosity epoxy-based composition suitable for electrical insulation and encapsulation applications.

A further object of this invention is to provide a method of preparing the coating and encapsulation compositions of this invention.

It is also an object of this invention to provide superior articles of manufacture prepared by coating them with the coating compositions of this invention.

These and other objects and advantages of this invention will become apparent from the following description.

SUMMARY OF THE INVENTION

The present invention is directed to a new solvent-free epoxy composition. The key feature of this invention is the use of a special, limited class of amine curing agents which have viscosities of about 100 cps. or less at ambient conditions and good compatibility with both non-volatile aromatic extenders and polyphenol epoxy components thus also reducing the need for reactive diluents. As a result of this invention, it is possible to prepare substantially solvent-free epoxy compositions suitable for pipe-coating, insulation, and electrical encapsulation applications. The resultant coatings show superior adhesion, water-resistance, chemical resistance, hardness, impact strength, and electrical resistance as compared with previously used materials.

The special amine curing agents of this invention are of two types: (a) a limited class of cycloaliphatic diamines; and, (b) polyamines having polyaliphatic oxide back-bones. This invention also includes a tertiary amine curing accelerator and may, optionally, include other conventional additives.

A further aspect of this invention is that a small proportion of the amine curing agent may be pre-reacted with a limited class of epoxide materials. This embodiment is in contrast to the prior art in which all or at least a predominant portion of the time curing agents are pre-reacted to form relatively viscous adducts.

DESCRIPTION OF THE INVENTION

The coating and encapsulation compositions of this invention in general consist essentially of:
(a) an epoxy material;
(b) a non-volatile aromatic extender;
(c) an amine curing agent; and,
(d) a curing accelerator.

The epoxy materials useful in this invention include the substituted and unsubstituted aromatic epoxy resins which are well-known in the art such as those based on bisphenol A and other polyphenols. Although other epoxy resins, such as aliphatic epoxides, may be added in limited amounts up to about 5 wt.-% of the total mixed composition, the principal epoxy agent must be polyphenol-based epoxy resin. For reasons discussed later, it is important to maintain a molar ratio of active epoxy groups to active amine groups in the range of 1 to 2 and preferably about 1.2 to 1.8.

The non-volatile aromatic extenders of this invention comprise materials such as coal tar and distillates of coke and petroleum which are relatively unreactive and have boiling points above about 200° C. It has been found that these materials introduce a high degree of moisture resistance, corrosion resistance, and adherence to the coating compositions of this invention. The aromatic extender comprises about 20-80 wt.-%, preferably about 40-60 wt.-%, of the total composition. Mixtures of coal tar and various distillate fractions may also be used in any desired relative proportions.

The amine curing agents of this invention are of two types: (a) a limited class of cycloaliphatic diamines; and, (b) polyamines having polyaliphatic oxide back-bones. These two types of special amine curing agents may be used individually or mixed in any relative proportions such as a ratio of about 1:4 to 4:1.

The cycloaliphatic diamine curing agents used in this invention are not new in themselves, but rather are a select group of a broader class of cycloaliphatic diamines which for several years have been used as curing agents for epoxy systems. The group of cycloaliphatic diamines which are useful in this invention are those having a molecular weight of about 200-600 and also having a single amine group directly attached to a single ring structure, while the other amine group is preferably attached to a carbon atom in an aliphatic chain, or else directly attached to a second ring structure. The term "cycloaliphatic" as used in this application includes any ringed structure having an adjacent aliphatic group. This includes aromatic and saturated carbocyclic ring structures as well as heterocyclic ring structures. Typical of this class of compounds is the material known as "isophorone diamine", also known variously under different chemical nomenclature as 3,5,5-trimethyl-3-(amino-methyl)-cyclohexylamine, 5-amino-1,3,3 trimethylcyclohexylmethylamine, 1-amino-(3-aminomethyl)-3,5,5-trimethyl cyclohexane, and 4, 4'-methylenebis-(2-methyl-cyclohexylamine). Other members of this limited class include menthane diamine and N-aminoethyl piperazine. Mixtures of these amines may also be used.

This special group of cycloaliphatic diamines is superior to the aliphatic amine curing agents which have low viscosities but tend to exude and are highly reactive with moisture. This group is also superior to aromatic diamine curing agents, in general, because such materials as methylene dianiline (MDA) tend to be viscous, slow-curing, and result in somewhat brittle coatings. Similar objections apply to some cycloaliphatic diamines, such as xylylene diamine and bis (aminopropyl) piperazine, in which both amine groups are attached to carbon atoms in aliphatic side chains. Likewise, the polyamide resin curing agents typically used in solvent systems are too viscous for solventless systems; and, the amido-amines which have low viscosities and are very compatible with coal tar/epoxy systems tend to produce coatings having inferior flexibility and water-resistance.

The second special class of amine curing agents which are useful in this invention are polyamines having polyaliphatic oxide back-bones and molecular weights of about 200-600. This class of polyamines is derived from polyols that have been polymerized with propylene oxide or related oxides, and the propylene oxide derivatives are known as polyoxypropylene polyamines. This class of amines has also been found to have low viscosity, good moisture-resistance, good compatibility with both the epoxy and aromatic extender components of the coating composition, and to contribute markedly to the flexibility and impact-resistance of the final coatings. However, this second class of curing agents does not provide as good water or heat resistance as the cycloaliphatic-aliphatic diamines, and the members of this class are generally slower curing than the amines of the first class. Many of the best properties of both classes can be realized, however, by using a mixture of amines selected from these two classes.

In addition to the special amine curing agents of this invention, it is necessary to employ a conventional tertiary amine curing accelerator up to about 5 wt.-% of the total final composition. Typical tertiary amine curing accelerators include DMP-10 and DMP-30 manufactured by Rohn and Haas Chemical Company.

Other materials which are optional but may be usefully added to the compositions of this invention are small amounts of non-reactive diluents and plasticizers (e.g. pine oil, dibutyl phthalate, TCP, and other compatible plasticizers and oils), fillers (e.g. talc, silicas, and other inert materials), thixotropic agents to prevent sagging, and reactive diluents for further reduction in viscosity and improved flexibility as hereinafter described.

A particularly desirable variation of the basic invention is to pre-react a portion of the amine curing agent of this invention with a small amount up to about 5 wt.-% of the total composition of a mono- or di-aliphatic epoxide or mixtures thereof. The presence of aliphatic diepoxides, as previously noted, has been found to improve the flexibility of the final coating. The presence of these materials in unreacted form, however, is sharply limited by the fact that they slow down the cure rate and increase the possibility of the aromatic extenders migrating to the surface. By pre-reacting the aliphatic epoxide with a portion of the amine curing agent, they may be usefully introduced into the coating composition of this invention with an improvement in the curing rate, and further decreasing the tendency of the aromatic diluents to migrate to the surface. Because aliphatic epoxides generally have very low viscosities, the addition of a small amount of aliphatic epoxide to the aromatic epoxide fraction can also be used to reduce the viscosity of this fraction closer to that of the amine curing fraction. It is desirable to have the respective viscosities of the two fractions relatively equal to facilitate easy and uniform blending at the mixing stage. However, this type of dilution of the standard epoxy resins tends to retard the cure rate and give progressively poorer coatings with increased use. A preferred use of these reactive epoxides is, therefore, to pre-mix them with the amine curing agent and at least a portion of the aromatic extender in limited quantities, and allowing them to form partial adducts at room temperature over a period of 24 hours or longer. These partial adducts contain hydroxyl groups that can accelerate the initial reaction rate and, in the case of the aliphatic polyepoxides, add further flexibility to the final coating.

It is important for this invention, however, that the ratio of active amine groups to active epoxide groups in the pre-reacted portion be at least about 2:1, and preferably 3:1 or greater. As the ratio approaches 2:1, the viscosities rise sharply, and the compositions above this ratio are too viscous for the purpose of this invention. It is also important that the ratio of active epoxide groups to active amine groups in the final mixture be in the range of 1 to 2, and preferably between 1.2 and 1.8. Thus, at ratios below about 1.2 there is too little cross-linking to produce a good final coating, whereas above a ratio of about 1.8 the final cure at room temperature becomes very slow.

The coating compositions of this invention are used as follows: first an epoxy fraction is prepared containing the liquid epoxy resins based on polyphenols, and optionally containing some of the aromatic extender and small amounts of low viscosity diluents such as the aliphatic epoxides; second, a curing agent fraction is prepared containing the special amine curing agents of this invention, the aromatic extenders and tertiary amine accelerators, and optionally, small amounts of pre-reacted aliphatic epoxides and/or phenols or other accelerators and allowed to age for about twenty-four hours or longer; third, the two fractions are thoroughly mixed and applied to the surface to be coated. The separate fractions are relatively stable and can be stored under ordinary conditions for as long as six months or more without significant deterioration or damage to the final coating. If the amine curing agent consists entirely or predominantly of polyamines having polyaliphatic oxide back-bones, the steps of pre-mixing the aromatic extender with the curing fraction and aging the resulting mixture may be omitted.

The mixed composition can then be applied to the surface which is to be coated by any suitable means such as brushing or spraying. Because of the very low viscosities of the compositions of this invention, less than about 1000 cps. and typically about 300-600 cps. at ambient conditions, these compositions are especially suitable for spraying applications. Once applied to a surface, the compositions of this invention cure and harden in about 1 to 12 hours at room temperatures to produce a uniform coating of any desired thickness, such as about 15-20 mils, having superior adhesion, water and chemical resistance, hardness, impact strength, flexibility, and electrical resistance as compared with previously used materials. Because the low viscosities of the compositions of this invention are realized without the presence of volatile solvents, surface defects during curing and fire-electrical hazards associated with previous compositions which included volatile solvents are thus eliminated.

The coating compositions of this invention are particularly useful in coating the exterior and interior surfaces of metal and concrete pipes and other types of conduits and for encapsulating electrical wiring.

The present invention is further described by reference to the following illustrative examples.

EXAMPLE I

To illustrate the preparation of solventless epoxy-/coal tar extended compositions suitable for spray application, 3-aminomethyl-3,5,5 trimethyl-1-cyclohehexylamine (isophorone diamine) is used as representative of the cycloaliphatic-aliphatic diamine class. A polyamine derived from polypropylene oxide with trimethylol propane as an initiator, having a molecular weight of 465 ("Jeffamine T-403"), is chosen as representative of the second class. An approximately equal blend of these two curing agents, with a ratio of amine equivalents at 2:1, is used to illustrate the properties that can be obtained by blending one or more curing agents from each of the two specific classes. The tertiary amine catalyst used is 2,4,6-tris-(dimethylaminomethyl)phenol ("Actiron NX-3"). The epoxy resin used is a standard grade derived from bisphenol A and having an epoxy equivalent weight of approximately 190 ("Araldite 6010").

When mixed at an epoxide/amine ratio of 1:5, the resulting polymers (disregarding the aromatic extender) have the following composition:

|  | Polymer 'A' | Polymer 'B' | Polymer 'C' |
|---|---|---|---|
| Isophorone Diamine | 21.6% | 12.2% | — |
| "Jeffamine T-403" | — | 13.3% | 33.5% |
| "Actiron NX-3" | 1.0% | 2.0% | 2.0% |
| "Araldite 6010" | 77.4% | 72.5% | 64.5% |

The amine curing agents were first mixed with varying amounts of a low viscosity coal tar/aromatic extender blend to reduce the proportion of these polymers successively to 80%, 60%, 40% and 20% of the total vehicle and were then stored for 24 hours or more before mixing with the epoxy resin. The low viscosity coal tar extender, Composition 'D', has the following composition:

| "CP-524 Coal Tar" (Allied Chemicals Corp.) | 50.0% |
|---|---|
| "Kenplast G" (Kenrich Petrochemicals, Inc.) | 45.0% |
| "Actiron NX-3" (Synthron, Inc.) | 5.0% |
|  | 100.0% |

The coal tar used has a viscosity of over 5000 cps at 20° C. and was extended with an aromatic distillate ("Kenplast G") having a boiling range of 271°–354° C. Since the amount of tertiary amine catalyst required varies with the amount of non-reactive extender added, the tertiary amine catalyst was incorporated with these aromatic extenders. The final viscosity of the coal tar extender was 120 cps.

The FIGURE shows the vehicle viscosities measured immediately after mixing with the epoxy resin as the percentage of Coal Tar Extender 'D' is increased. Table I includes this data and the results obtained when 15 mil films were cast and cured at 20° C. for 24 hours, followed by heat aging at 60° C. for 24 hours.

the quality of the resulting cured surface. Thus, examples 1, 6 and 11, which include no aromatic extender, have good hardness characteristics and satisfactory surface appearance. However, these examples also are much too viscous (viscosities well above 1000 cps.) for satisfactory spray applications. Furthermore, these examples also have extremely short pot-lives and low impact resistance. On the other hand, examples 5, 10 and 15, which comprise 80% aromatic extender, have extremely low viscosities, long pot-lives and excellent impact resistance, but cure too slowly and do not give good surface appearances.

In the intermediate ranges of 40–60% aromatic extender, all three amine curing compositions, 'A', 'B', and 'C' (examples 3, 4, 8, 9, 13 and 14), yield final coating compositions with low viscosities (below 1000 cps.), good pot-lives, and good hardness, impact resistance and surface characteristics. It can be seen, however, that amine curing composition 'C' comprising polyoxypropylene polyamine tends to result in coating compositions with longer pot-lives and better impact resistance but also slower curing rates and less satisfactory hardness than curing composition 'A' comprising cycloaliphatic-aliphatic diamines. By blending these two amine curing agents as in composition 'B', however, the results are low viscosities, good pot-lives, and good hardness and surface characteristics.

EXAMPLE II

In this example, mixtures of Polymer 'A', the cycloaliphatic-aliphatic diamine curing agent, are tested using a second aromatic extender composition 'E' having a viscosity of 260 cps. The new aromatic extender 'E', which has a petroleum pitch sold under the tradename "Pioneer PPD" as its principal component, has the following composition:

| "Pioneer PPD" (Witco Chemical Corp.) | 75.0% |
|---|---|
| "Kenplast G" (Kenrich Petrochemicals, Inc.) | 20.0% |
| "Actiron NX-3" (Synthron, Inc.) | 5.0% |
|  | 100.0% |

TABLE I

| Example Number | Weight % Polymer 'A' | Weight % Polymer 'B' | Weight % Polymer 'C' | Viscosity cps (at 20° C.) | Pot-life hours | Shore A Durometer (After 24 hours) | Impact* in.-lbs. (After Heat Aging) | Surface Appearance |
|---|---|---|---|---|---|---|---|---|
| 1 | 100 |  |  | 2,240 | 2 | 100 | 10 | S |
| 2 | 80 |  |  | 1,080 | 3 | 100 | 10 | S |
| 3 | 60 |  |  | 670 | 5 | 98 | 20 | S |
| 4 | 40 |  |  | 372 | 8+ | 92 | 20 | S |
| 5 | 20 |  |  | 246 | 24+ | Not Set | 120 | PG |
| 6 |  | 100 |  | 1,680 | 3 | 100 | 10 | S |
| 7 |  | 80 |  | 1,250 | 4 | 99 | 20 | S |
| 8 |  | 60 |  | 730 | 8+ | 94 | 60 | S |
| 9 |  | 40 |  | 460 | 8+ | 91 | 70 | S |
| 10 |  | 20 |  | 260 | 24+ | Not Set | 120 | PG |
| 11 |  |  | 100 | 1,564 | 8+ | 99 | 40 | S |
| 12 |  |  | 80 | 1,300 | 8+ | Tacky | 60 | S |
| 13 |  |  | 60 | 842 | 16+ | Tacky | 40 | S |
| 14 |  |  | 40 | 434 | 24+ | Not Set | 40 | S |
| 15 |  |  | 20 | 256 | 24+ | Not Set | 100 | PG |

Surface Appearance:
S = Satisfactory;
PG = Poor Gloss Retention
*ASTM G14-72

The results in Table I demonstrate that highly satisfactory, low viscosity, solvent-free coating compositions can be made according to this invention. Table I suggests that there is a trade-off between the low viscosity and long pot-life of the final mixed composition and The results of these tests appear below in Table II:

TABLE II

Results with Low Viscosity Petroleum Pitch Extender 'E'

| Example Number | Weight % Polymer 'A' | Weight % Polymer 'B' | Weight % Polymer 'C' | at 20° C. V% co-sity cps | at 20° C. Pot-life hours | After 24 hours Shore A Duro-meter | After Heat Aging Im-pact* in.-lbs | After Heat Aging Surface Appear-ance |
|---|---|---|---|---|---|---|---|---|
| 16 | 80 | | | 1,080 | 3 | 99 | 20 | S |
| 17 | 60 | | | 640 | 8+ | 98 | 20 | S |
| 18 | 40 | | | 370 | 8+ | Tacky | 10 | S |

Surface Appearance:
S = Satisfactory;
PG = Poor Gloss Retention
*ASTM G14-72

Again it is seen that particularly when 40-60% aromatic extender is used, the result is a low viscosity, solvent-free coating composition with good pot-life and satisfactory surface characteristics.

EXAMPLE III

In this example, the effect of adding varying amounts of pre-reacted aromatic and aliphatic mono- or diepoxides is tested. Table III lists the vehicle viscosities measured immediately after mixing with the epoxy resin at a constant percentage of Coal Tar Extender 'D' but with varying amounts of an aromatic or an aliphatic mono- or diepoxide allowed to pre-react with the amine/aromatic extender portion by storing for 24 hours or more at room temperature. The ratio of Coal Tar Extender 'D' to Polymer 'B' is the same 60:40 ratio used in Example 9 of Table I. The aromatic diepoxide is the standard bisphenol A type, with an eew of about 190. The aliphatic diepoxide, "Dow Epoxy Resin 736", has an identical eew. For the aliphatic monoepoxide, a 2:1 blend of "Araldite RD-1" and "Epoxide 8" was used to give the same eew. The aromatic monoepoxide used was cresyl glycidyl ether, also having an eew of about 190.

dominantly comprised of such adducts, clearly will not meet the viscosity requirements of this invention. Although aliphatic monoepoxides can be utilized at higher levels than the aliphatic diepoxides, they have an adverse effect on the cure rate. Aromatic monoepoxides were found to be most suitable for reducing the initial concentration of aliphatic primary amines with minimal effect on the final mixed viscosity, although aliphatic diepoxides gave better flexibility and impact resistance. Of course, blends of these materials can also be used.

Having described the invention, what is claimed is:

1. A coating composition having a viscosity less than about 1000 cps. which is substantially free of volatile solvent consisting essentially of:
   (a) an epoxy fraction consisting of polyphenol epoxy resins and mixtures thereof; and,
   (b) a curing fraction consisting essentially of:
      (1) about 20-80 wt.-% based on the total coating composition of a non-volatile, aromatic extender selected from the group consisting of coal tar, distillates of coke and petroleum with boiling points above about 200° C., and mixtures thereof;
      (2) an amine curing agent having a molecular weight of about 200-600 selected from the group consisting of:
         (i) cycloaliphatic diamines having a single amine group directly attached to a single ring structure and the other amine group directly attached to a carbon atom in an aliphatic chain or to a second ring structure;
         (ii) polyamines having polyaliphatic oxide backbones; and,
         (iii) mixtures thereof; and,
      (3) a curing accelerator selected from the group consisting of tertiary amines.

2. The coating composition of claim 1 wherein said non-volatile, aromatic extender comprises a mixture of coal tar and aromatic distillates.

3. The coating composition of claim 1 wherein said amine curing agent is selected from the group consisting of isophorone diamine, menthane diamine, N-aminoethyl piperazine, and mixtures thereof.

4. The coating composition of claim 1 wherein said amine curing agent comprises a mixture of cycloaliphatic diamine and polyamines having polyaliphatic oxide back-bones in a ratio ranging from about 1:4 to 4:1.

TABLE III

Properties of Epoxy Compositions Using Partially Reacted Amine Curing Agents

Composition: 40% Total Epoxy Resin, 60% Low Viscosity Coal Tar Extender 'D'

| Example Number | Pre-reacted Epoxy Weight % | Pre-reacted Epoxy Epoxide to Amine Ratio | Type of Epoxide | Viscosity at 20° C. cps | Shore A Durometer 24 hrs. | After Heat Aging in.-lbs. Impact Strength | After Heat Aging Surface Appearance |
|---|---|---|---|---|---|---|---|
| 9 | 0 | 0 | None | 460 | 91 | 60 | S |
| 19 | 1.9 | 0.10 | Aromatic | 660 | 93 | 50 | S |
| 20 | 3.6 | 0.20 | Difunc- | 1,060 | 94 | 40 | S |
| 21 | 4.4 | 0.25 | tional | 1,350 | 95 | 20 | S |
| 22 | 1.9 | 0.10 | Aliphatic | 646 | 92 | 60 | S |
| 23 | 3.6 | 0.20 | Difunc- | 870 | 92 | 60 | S |
| 24 | 4.4 | 0.25 | tional | 1,010 | 93 | 60 | S |
| 25 | 1.9 | 0.10 | Aliphatic | 504 | Sl. Tack | 60 | S |
| 26 | 3.6 | 0.20 | Monofunc- | 540 | Sl. Tack | 60 | S |
| 27 | 4.4 | 0.25 | tional | 590 | Tacky | 60 | S |
| 28 | 1.9 | 0.10 | Aromatic | 632 | 94 | 40 | S |
| 29 | 3.6 | 0.20 | Monofunc- | 756 | 91 | 40 | S |
| 30 | 4.4 | 0.25 | tional | 880 | 91 | 40 | S |

Surface Appearance: S = Satisfactory

The results in Table III demonstrate the criticality with respect to viscosity of adding even very small amounts of pre-reacted epoxides to the compositions of this invention. Examples 19-21 show that adding less than 5 wt.-% of an adduct of an aromatic difunctional epoxide causes the viscosity of the mixed coating composition to exceed 1000 cps. Thus, the compositions of U.S. Pat. Nos. 3,629,181 and 3,704,229, which are pre- 5. The coating composition of claim 1 wherein the ratio of active epoxy groups to active amine groups is in the range of about 1 to 2.

6. The coating composition of claim 5 wherein said ratio is in the range of about 1.2 to 1.8.

7. The coating composition of claim 1 additionally containing up to about 5 wt.-% of the total composition of a mono- or di-aliphatic epoxide or mono-aromatic epoxide and mixtures thereof.

8. The coating composition of claim 7 wherein at least a portion of said mono- or di-aliphatic epoxide or mono-aromatic epoxide is pre-reacted with the amine curing agent.

9. The coating composition of claim 8 wherein the ratio of active amine groups to active epoxide groups in said pre-reacted portion is about 3:1 or greater.

10. The coating composition of claim 1 additionally containing an inert filler.

11. The coating composition of claim 1 additionally containing a thixotropic agent.

12. A method of coating the surfaces of solid articles with a protective coating which comprises the steps of:
(a) preparing an epoxy fraction consisting essentially of polyphenol epoxy resins;
(b) preparing a curing fraction consisting essentially of an amine curing agent and from about 20–80 wt.-% based on the total coating composition of a non-volatile, aromatic extender wherein said amine curing agent has a molecular weight of about 200–600 and is selected from the group consisting of:
 (i) cycloaliphatic diamines having a single amine group directly attached to a single ring structure and the other amine group directly attached to a carbon atom in an aliphatic chain or to a second ring structure;
 (ii) polyamines having polyaliphatic oxide backbones; and,
 (iii) mixtures thereof; and said aromatic extender is selected from the group consisting of coal tar, distillates of coke and petroleum with boiling points above about 200° C. and mixtures thereof;
(c) aging said curing fraction for about twenty-four hours or longer;
(d) combining the epoxy fraction and the curing fraction in the absence of volatile solvent to obtain a composition having a viscosity less than about 1000 cps; and,
(e) applying the resulting composition to the surfaces of the articles to be covered.

13. The method of claim 12 wherein said non-volatile, aromatic extender comprises a mixture of coal tar and aromatic distillate.

14. The method of claim 12 wherein said amine curing agent is isophorone diamine.

15. The method of claim 12 wherein said amine curing agent comprises a mixture of cycloaliphatic diamine and polyamines having polyaliphatic oxide back-bones in a ratio ranging from about 1:4 to 4:1.

16. The method of claim 12 wherein the ratio of active epoxy groups in the epoxy fraction to active amine groups in the amine fraction is in the range of about 1 to 2.

17. The method of claim 16 wherein said ratio is in the range of about 1.2 to 1.8.

18. The method of claim 12 wherein said epoxy fraction includes up to about 5 wt.-% of the total final composition of a mono- or di-aliphatic epoxide or mono-aromatic epoxide and mixtures thereof.

19. The method of claim 12 wherein said curing fraction includes up to about 5 wt.-% of the total final composition of a mono- or di-aliphatic epoxide or mono-aromatic epoxide and mixtures thereof pre-reacted with the amine curing agent.

20. The coating composition of claim 19 wherein the ratio of active amine groups to active epoxide groups in said pre-reacted portion is about 3:1 or greater.

21. The method of claim 12 wherein said curing fraction includes up to about 5 wt.-% of the total final composition of a tertiary amine curing accelerator.

22. The method of claim 12 wherein the combined composition is applied by spraying.

23. The method of claim 12 wherein the combined composition is applied by brushing.

24. An article comprising a metal or concrete conduit coated along at least one surface with a coating composition consisting essentially of the reaction product of:
(a) an epoxy fraction consisting essentially of polyphenol epoxy resins; and,
(b) a curing fraction consisting essentially of an amine curing agent and from about 20–80 wt.-% based on the total coating composition of a non-volatile, aromatic extender wherein said amine curing agent has a molecular weight of about 200–600 and is selected from the group consisting of:
 (i) cycloaliphatic diamines having a single amine group directly attached to a single ring structure and the other amine group directly attached to a carbon atom in an aliphatic chain or to a second ring structure;
 (ii) polyamines having polyaliphatic oxide backbones; and,
 (iii) mixtures thereof;
and said aromatic extender is selected from the group consisting of coal tar, distillates of coke and petroleum with boiling points above about 200° C. and mixtures thereof.

25. The article of claim 24 wherein said coating has a thickness of about 15–20 mils.

* * * * *